US008457356B2

(12) United States Patent
    Zheng (10) Patent No.: US 8,457,356 B2
(45) Date of Patent: Jun. 4, 2013

(54) METHOD AND SYSTEM OF VIDEO OBJECT TRACKING

(75) Inventor: Qinfen Zheng, Ellicott City, MD (US)

(73) Assignee: SET Corporation, Arlington, VA (US)

( * ) Notice: Subject to any disclaimer, the term of this patent is extended or adjusted under 35 U.S.C. 154(b) by 46 days.

(21) Appl. No.: 13/278,573

(22) Filed: Oct. 21, 2011

(65) Prior Publication Data

US 2012/0099765 A1   Apr. 26, 2012

Related U.S. Application Data

(60) Provisional application No. 61/405,386, filed on Oct. 21, 2010.

(51) Int. Cl.
    *G06K 9/00*   (2006.01)
(52) U.S. Cl.
    USPC .......................................................... 382/103
(58) Field of Classification Search
    USPC .......................................................... 382/103
    See application file for complete search history.

(56) References Cited

U.S. PATENT DOCUMENTS

| 5,418,595 | A  | * | 5/1995 | Iwasaki et al. | 396/95 |
| 5,757,422 | A  | * | 5/1998 | Matsumura | 348/169 |
| 6,337,916 | B1 | * | 1/2002 | Boyd et al. | 382/103 |
| 8,253,800 | B2 | * | 8/2012 | Takeuchi et al. | 348/169 |

* cited by examiner

*Primary Examiner* — Tom Y Lu
(74) *Attorney, Agent, or Firm* — Arent Fox LLP (57) ABSTRACT

Methods and systems are provided to determine a target tracking box that surrounds a moving target. The pixels that define an image within the target tracking box can be classified as background pixels, foreground pixels, and changing pixels which may include pixels of an articulation, such as a portion of the target that moves relatively to the target tracking box. Identification of background image pixels improves the signal-to-noise ratio of the image, which is defined as the ratio between the number of pixels belonging to the foreground to the number of changing pixels, and which is used to track the moving target. Accordingly, tracking of small and multiple moving targets becomes possible because of the increased signal-to-noise ratio.

20 Claims, 12 Drawing Sheets

METHOD AND SYSTEM OF VIDEO OBJECT TRACKING

BACKGROUND OF THE INVENTION

1. Field of Invention

Aspects of the present invention relate to video tracking of various objects. More particularly, various aspects of the present invention relate to video tracking of objects using dynamic separation of foreground and background.

2. Description of Related Art

While remote monitoring systems relying on an imaging device, such as a television (TV) camera have been conventionally used in a wide range of applications, many of these applications require manned monitoring systems, which employ a watchperson who supervises a monitor while viewing images displayed on the monitor. In this type of manned monitoring system, a watchperson is required to watch images displayed on a monitor at all times to identify in real time an intruding object, such as a person, a car, or the like, which can come into a field of view being monitored. In effect, a heavy burden is placed on the watchperson, since the watchperson must use their visual ability to detect moving objects and/or persons in the field of view. Because a watchperson has inherently human limitations in concentration and visual ability, the manned monitoring system can experience overlooked intruding objects, which should not be ignored, and therefore has a reliability problem. Also, as monitoring cameras become increasingly widespread, a single watchperson often monitors images from a number of cameras such as, for example, TV cameras on a plurality of monitors at the same time. The watchperson can also overlook an intruding object when a plurality of cameras must be simultaneously monitored.

Therefore, an automatic tracking monitoring system would be useful for automatically detecting an intruding object through image processing of images captured by cameras, instead of the traditional human-based monitoring. Among other things, such an automated system may be needed that will automatically adjust the visual field, viewing direction, and viewing angle of the cameras, in accordance with motions of the intruding object, and, for example, generate a predetermined report and/or alarm.

Target tracking is a core function widely used in many automated video systems. The basic idea of target tracking is to match object appearance across different and successive images. Video trackers often have the dilemma of the background interfering with the foreground during the tracking of a moving person or object. Background pixels within a target tracking box, which is a theoretical box surrounding the moving object or person, go through the same mathematical transformation as the foreground pixels, and thus hinder true target matching. In the related art, background pixels within a target tracking box have been a nuisance. For example, one aspect of background pixels is that they change from frame to frame with respect to the target tracking box, while foreground pixels within the target tracking box are more consistent, since they correspond to the object or person being tracked.

Most related art solutions aim to reduce the influence of background pixels through exploiting temporal consistency in the appearance, structure, motion, and the statistical signature of the foreground pixels. However, one fundamental issue of background disruption is that the foreground has not been directly and effectively addressed, thereby creating video trackers vulnerable to imperfect initial target segmentation and appearance morphing. A reliable dynamic foreground and background separation mechanism would dramatically boost video tracker performance.

SUMMARY OF THE INVENTION

In light of the above described problems and unmet needs, as well as others, methods and systems are provided to determine a target bounding box, or tracking box, which bounds or surrounds a moving target, such as any object, for example, a moving individual or vehicle. According to various aspects, the pixels within the target bounding box can be classified as background pixels, foreground pixels, and changing pixels. Background pixels may include pixels that belong to the background, such as a sidewalk or a lamp post, within the target bounding box. Foreground pixels may include pixels belonging to the target, such as the head of a moving individual, for example, walking down a street. Changing pixels may include pixels that change during the period of tracking of the target. For example, changing pixels may include pixels of an articulation, such as a portion of the target that moves within the target bounding box.

According to various aspects, the size of the target bounding box, or tracking box, can be modified during tracking, which may be desirable, for example, when tracking a target based on an imperfect initial target detection, without the need to use continuous moving target detection. According to various aspects, no more than two video frames or images may be needed to track a target, an initial video frame image and a later video frame image, although more than two video frames or images may also be used. The use of only two image frames for purposes of moving target detection, for example, simplifies the calculations involved in the detection, reduces needed processing power, and allows for tracking a target from a moving platform.

According to various aspects of the current invention, identification of background image pixels increases the quality of the image of the target, and thus improves the quality of tracking of the target, resulting in a significant increase in the signal-to-noise ratio because the signal-to-noise ratio is calculated as a ratio between a number of pixels belonging to the foreground to a number of changing pixels. Thus, identifying background pixels facilitates this calculation. Accordingly, tracking of small moving targets becomes possible because of the increased signal-to-noise ratio. Also, multiple moving targets can be tracked contemporaneously, even if the multiple targets are within close proximity to each other, because of the increased signal-to-noise ratio. The systems and methods according to aspects of this invention may also allow for tracking groups of targets that split or merge.

According to various aspects of the current invention, non-rigid objects, such as the moving arms or legs of an individual who is being tracked, can also be tracked, and do not decrease the quality of the video tracking.

Additional advantages and novel features of various aspects of the invention will be set forth in part in the description that follows, and in part will become more apparent to those skilled in the art upon examination of the following or upon learning by practice of the invention.

BRIEF DESCRIPTION OF THE DRAWINGS

Various exemplary aspects of the systems and methods will be described in detail, with reference to the following figures, wherein.

DETAILED DESCRIPTION OF PREFERRED ASPECTS

These and other features and advantages of various aspects of this invention are described in, or are apparent from, the following detailed description.

Figure 1:
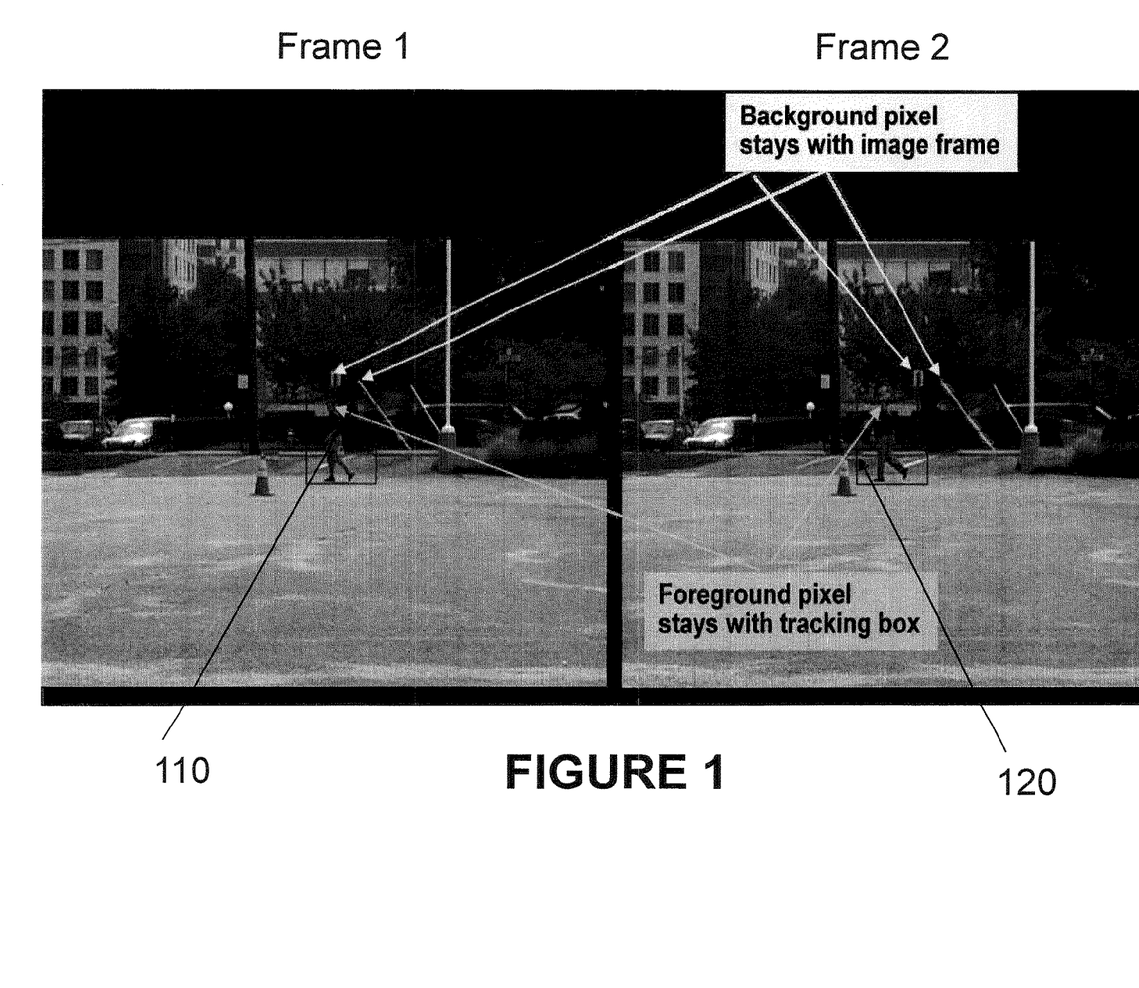
FIG. 1 is an exemplary image of video tracking according to various aspects of the present invention.

FIG. 1 is an exemplary image of video tracking according to various aspects of the present invention. In FIG. 1, the virtual bounding box 110 surrounding the individual, or target, in both Frame 1 and Frame 2 represents the target bounding box or tracking box. As the target moves along Frame 1, the bounding box 110 follows the target and is represented at a later time by box 120 in Frame 2. It should be noted that the expressions "target bounding box," "target tracking box," and "tracking bounding box" may be used interchangeably in this disclosure. According to various aspects, the pixels within each bounding box can be classified as either i) foreground pixels, ii) background pixels, or iii) changing pixels. The foreground pixels may include the pixels representing non-moving portions of the target, such as the torso of the individual who is being tracked, within the target bounding box. The background pixels may include the pixels representing the area surrounding the individual being tracked and within the target bounding box. The changing pixels may include pixels that correspond to one or more movable portions of the target, such as an arm of the individual or object being tracked.

According to various aspects of the current invention, a changing pixel may correspond to a moving portion of the target such as, for example, to the arm of the individual being tracked, and the intensity of the changing pixel may change as the arm moves relative the individual inside the target bounding box. The term "intensity" of a pixel in this disclosure refers to the image intensity of the pixel, or its illumination, in the frame. Accordingly, if the intensity of a pixel does not change over time, then it may be considered that no movement is recorded at the location of that pixel. On the other hand, if the intensity of the pixel changes, then a movement may be determined to have occurred at the location of the pixel. It should be noted that a changing pixel could be part of the foreground or part of the background, at any given time. Over time, a changing pixel could be part of the foreground, and then at a later time be part of the background, for example. According to various aspects of the current invention, tracking the individual illustrated in FIG. 1 may involve identifying and calculating the number of foreground pixels, background pixels, and changing pixels, respectively.

Figure 2A:
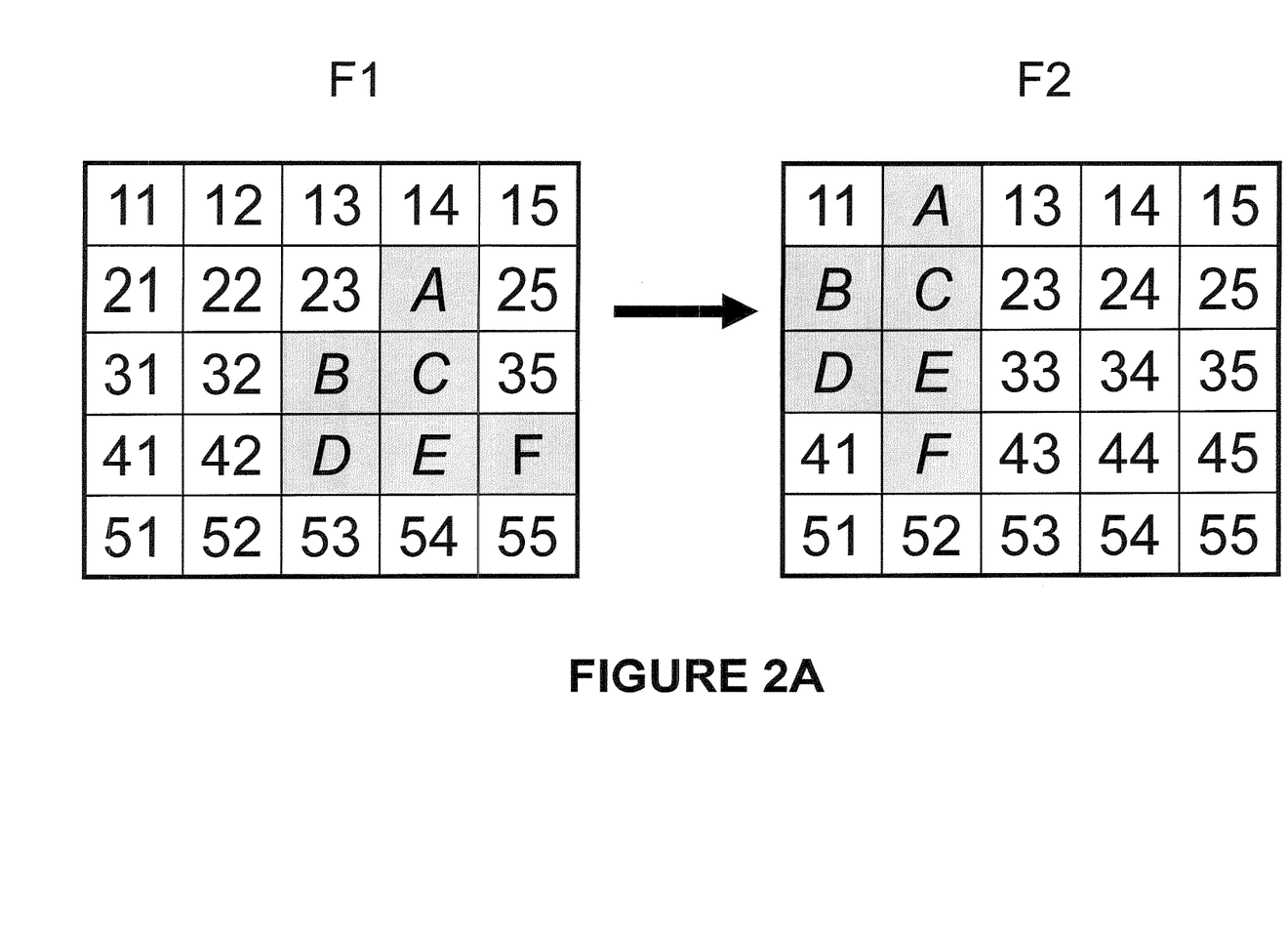
FIG. 2A is an exemplary representative diagram illustrating video tracking according to various aspects of the present invention.

FIG. 2A is an exemplary representative diagram illustrating video tracking according to various aspects of the present invention. In FIG. 2A, the foreground pixels identified with letters represent the moving object or person within the target tracking box, and change location inside the tracking bounding box, or tracking box, as the individual moves within the box. On the other hand, the pixels with numbers correspond to the background pixels within the box. It should be noted that pixels that are initially part of the background and then became part of the foreground, such as pixel 42, shown in representative tracking bounding box of frame F1 at an initial time, are the changing pixels. For example, pixel 42 in frame F1 is a changing pixel, while pixels 11 and 15 are background pixels, and the pixel directly beneath pixel 23, labeled "B" in frame F1 and "F" in frame F2, is a foreground pixel.

According to various aspects of the current invention, two frames may be used to track an individual. For example, in FIG. 2A, the pixels within the tracking bounding box of frame F1 are compared to the equivalently located pixels within the tracking bounding box of frame F2. Frame F1 may correspond to an image captured at a first time T1, and frame F2 may correspond to an image captured at a second time T2, for example. As the target bounding box moves from a first location in frame F1 to a second location in frame F2, any pixel that does not move with the bounding box, such as a pixel corresponding to the tree shown in FIG. 1, may be considered to be a background pixel. On the other hand, any pixel that moves with the bounding box, such as a pixel corresponding to the individual being tracked in FIG. 1, may be considered to be part of the foreground. Additionally, within the bounding box, any pixel that moves relatively to the bounding box, but for which intensity changes between frames F1 and F2, may be considered to be a changing pixel, such as a pixel corresponding to the moving arm of the individual being tracked. The above reasoning can be summarized via the equations expressed below.

According to various aspects of the current invention, a given pixel within the tracking bounding box, or tracking box, may have the relative coordinates (i,j), the relative coordinates being coordinates relative to the reference system of the tracking bounding box, not with reference to absolute or world coordinates. In other words, relative coordinates of (1,1) may correspond to the pixel located at the upper-most layer and the left-most column of the tracking bounding box. For example, in the illustration of FIG. 2A, pixel 11 may have the relative coordinates (1,1) while pixel 35 may have the relative coordinates (5,3). The tracking bounding boxes on each frame F1 and F2 will have different world coordinates, which are coordinates with respect to an absolute reference of $(x_1, y_1)$ and $(x_2, y_2)$. The intensities of each pixel are expressed as f(x+i,y+j), where f is the intensity of a given pixel, (x,y) is the location of one corner of the tracking bounding box that corresponds to a relative coordinate of (0,0), and (i,j) is the location of the pixel with respect to the target bounding box. Additionally, $f_1(x, y)$ is an intensity measurement at time $t_1$ for frame F1, and $f_2(x, y)$ is an intensity measurement at time $t_2$ for frame F2.

According to various aspects of the current invention, a background pixel includes a pixel that fulfills the following equations (1)-(3):

$$f_1(x_1+i, y_1+j) = f_2(x_1+i, y_1+j), \text{ and} \qquad (1)$$

$$f_1(x_2+i, y_2+j) = f_2(x_2+i, y_2+j), \text{ and} \qquad (2)$$

$$f_1(x_1+i, y_1+j) \neq f_2(x_2+i, y_2+j) \qquad (3)$$

According to various aspects of the current invention, a foreground pixel is a pixel that fulfills the following equations (4)-(6):

$$f_1(x_1+i,y_1+j) \neq f_2(x_1+i,y_1+j), \text{ or} \quad (4)$$

$$f_1(x_2+i,y_2+j) \neq f_2(x_2+i,y_2+j), \quad (5)$$

and $$f_1(x_1+i,y_1+j) = f_2(x_2+i,y_2+j) \quad (6)$$

According to various aspects of the current invention, a changing pixel is a pixel that does not fulfill equations (1)-(3) nor equations (4)-(6).

According to various aspects of the current invention, once every pixel inside the target bounding box, or tracking box, is identified as a foreground pixel, a background pixel, or a changing pixel, the various pixels are counted. For example, $N_f$ represents the total number of foreground pixels within the target bounding box, $N_b$ represents the total number of background pixels within the target bounding box, and $N_c$ represents the total number of changing pixels within the target bounding box. According to various aspects of the current invention, the signal-to-noise ratio (SNR) is defined as the ratio of the number of foreground pixels $N_f$ to the number of changing pixels $N_c$, as expressed in the following equation:

$$SNR = N_f/N_c \quad (7)$$

As such, improved tracking capability is achieved when the signal-to-noise ratio, which is the ratio $N_f/N_c$, is highest. Accordingly, tracking a moving target can be achieved by determining which area in the vicinity of frame F2, where a second target box can be defined, which may have the same size as the target bounding box, can provide the highest ratio of $N_f/N_c$. Thus, the movement of the target being tracked can be determined by performing the above-described calculation in equations (1)-(7) in a number of areas around the predicted location of the initial target bounding box, in order to find the next location where the highest SNR can be found. When the next location with the highest SNR around the initial target bounding box, or tracking box, is found, then it is determined that the next location is a location where the target is currently located. Thus, the target has been tracked. A new target bounding box is then created at that next location around the target. According to various aspects of the current invention, once the target box has been moved to the new location where the target is located, the above calculation expressed in equations (1)-(7) can be performed to determine yet the next location, which would be a third location, towards which the target may be moving, that location being the location where the SNR, expressed in equation (7), is the highest. As such, while moving within the frame of the video recording, the target can be tracked via the calculation of successive target bounding boxes, which are determined via the above-described equations (1)-(7), and that successively determine the location of the next area for which the SNR is highest.

According to various aspects of the current invention, finding the second target bounding box can be accomplished by defining a number of second bounding boxes in a generally outward direction from the location of the first target box in the second image frame. For example, a plurality of second bounding boxes can be defined circularly around the first target bounding box, and a signal-to-noise ratio can be calculated as discussed above for each one of them to determine the second bounding box with the highest signal-to-noise ratio. Alternatively, as many second bounding boxes as can fit the image frame can be defined, where each of the second bounding boxes may have the same size as the target bounding box. As such, a signal-to-noise ratio may be calculated for each one of the second bounding boxes to determine the one with the highest signal-to-noise ratio. Once the second target bounding box with the highest signal-to-noise ratio has been defined, then the second target bounding box is adjusted to minimally include all foreground pixels and becomes the new target bounding box, or tracking box, and the same operation to define second bounding boxes can be repeated. As a result, the moving target may be continually tracked.

According to various aspects of the current invention, multiple targets can also be tracked within the same video frame by creating a tracking bounding box around each individual target. Because only two frames per target are needed at any given time to track the movement of each target, tracking multiple targets is well within the processing capability of the video and memory equipment needed to perform the simultaneous tracking. Multiple targets can also be tracked even when they are in close proximity to each other, where, for example, each target may have its own target bounding box and its own set of calculations, as discussed above with respect to equations (1)-(7).

Figure 2B:
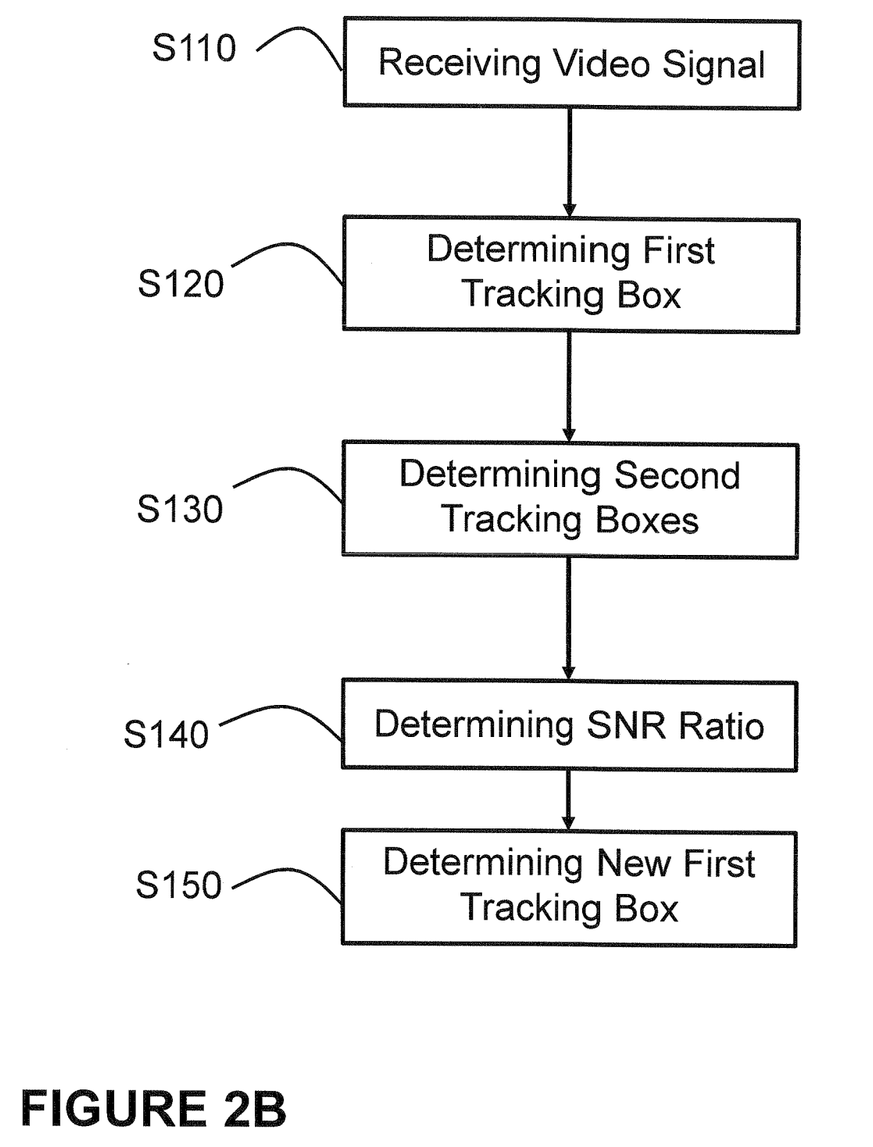
FIG. 2B is a flow chart illustrating a method of video tracking according to various aspects of the present invention.

FIG. 2B is a flow chart illustrating a method of video tracking according to various aspects of the present invention. In FIG. 2B, the method starts a S110, where a video signal is received. The video signal may include a video image or frame, and at S120, a first tracking box may be defined around one or more moving objects to be tracked. For example, the first tracking box may be defined manually by a user, or defined via calculation as explained below. After the first tracking box has been defined at S120, a plurality of second tracking boxes may also be defined at S130 in the video image, the second tracking boxes being located in areas of the image around the area where the first tracking box has been defined. For example, the second tracking boxes may be defined manually by a user, or calculated based on the position and the size of the first tracking box. According to various aspects, once the second tracking boxes have been defined at S130, a signal-to-noise ratio may be calculated and monitored for each one of the second tracking boxes at S140. As such, a second tracking box that has the highest signal-to-noise ratio may be determined. According to various aspects of the current invention, the fact that the signal-to-noise ratio is highest in a given second tracking box is indicative of the presence of the one or more moving objects in the area defined by that second tracking box with the highest signal-to-noise ratio, the one or more objects having moved away from the first tracking box. For example, a moving individual or vehicle that is being tracked and that was located inside the first tracking box during S120 has moved away from the first tracking box and is now determined to be in the second tracking box that has the highest signal-to-noise ratio. According to various aspects, the second tracking box with the highest signal-to-noise ratio, which is the box where the one or more moving objects to be tracked are now located, is then determined to be the new first tracking box, and steps S110 through S150 may be repeated to continually track the one or more moving objects.

According to various aspects of the current invention, one way to determine the first tracking box without the need of a user defining the first tracking box may be to perform the above-described calculation of signal-to-noise ratio over the entirety of the video image and determine which area has the highest signal-to-noise ratio, which may be indicative of a moving target susceptible to be tracked.

Figure 3:
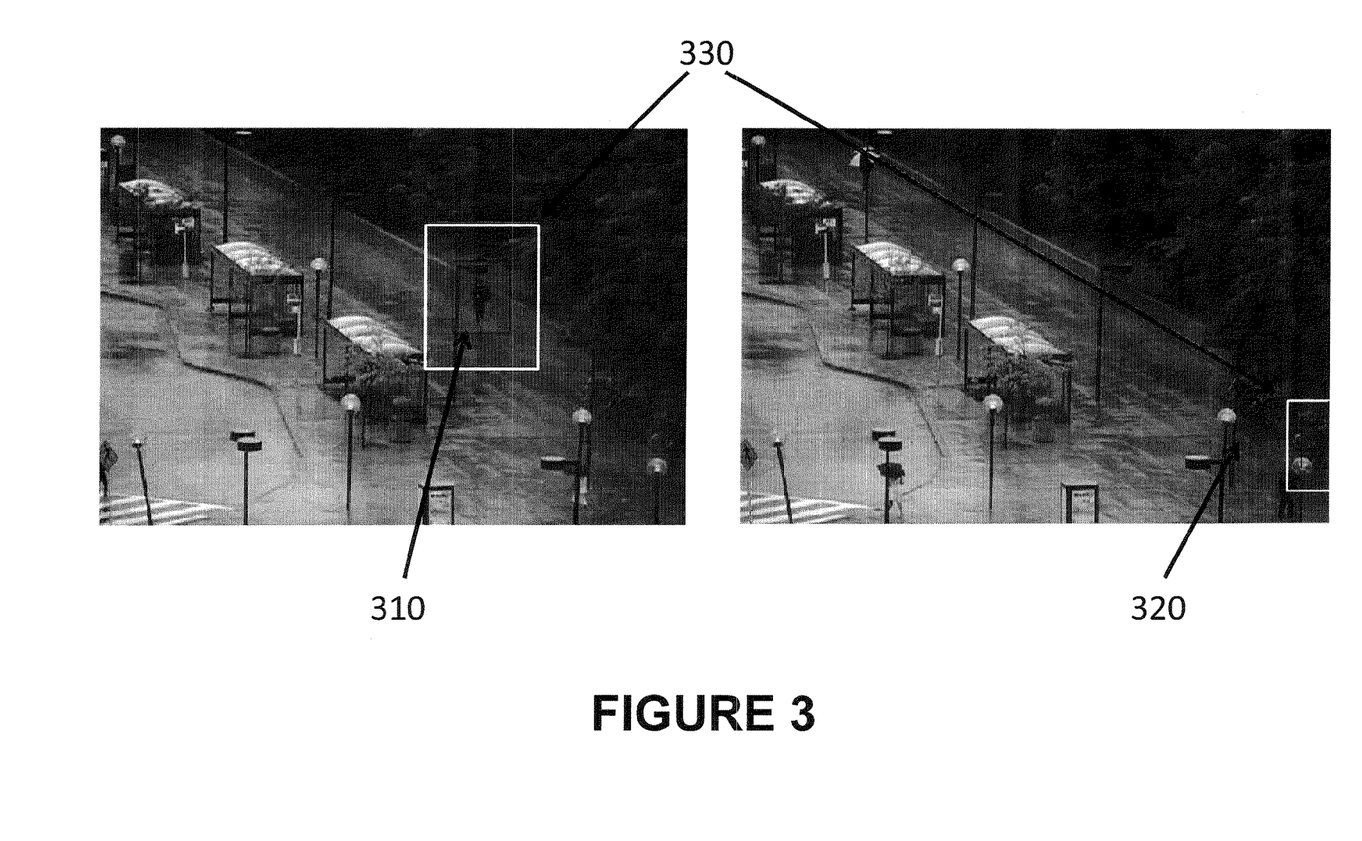
FIG. 3 is an exemplary image of video tracking according to various aspects of the present invention.
Figure 4:
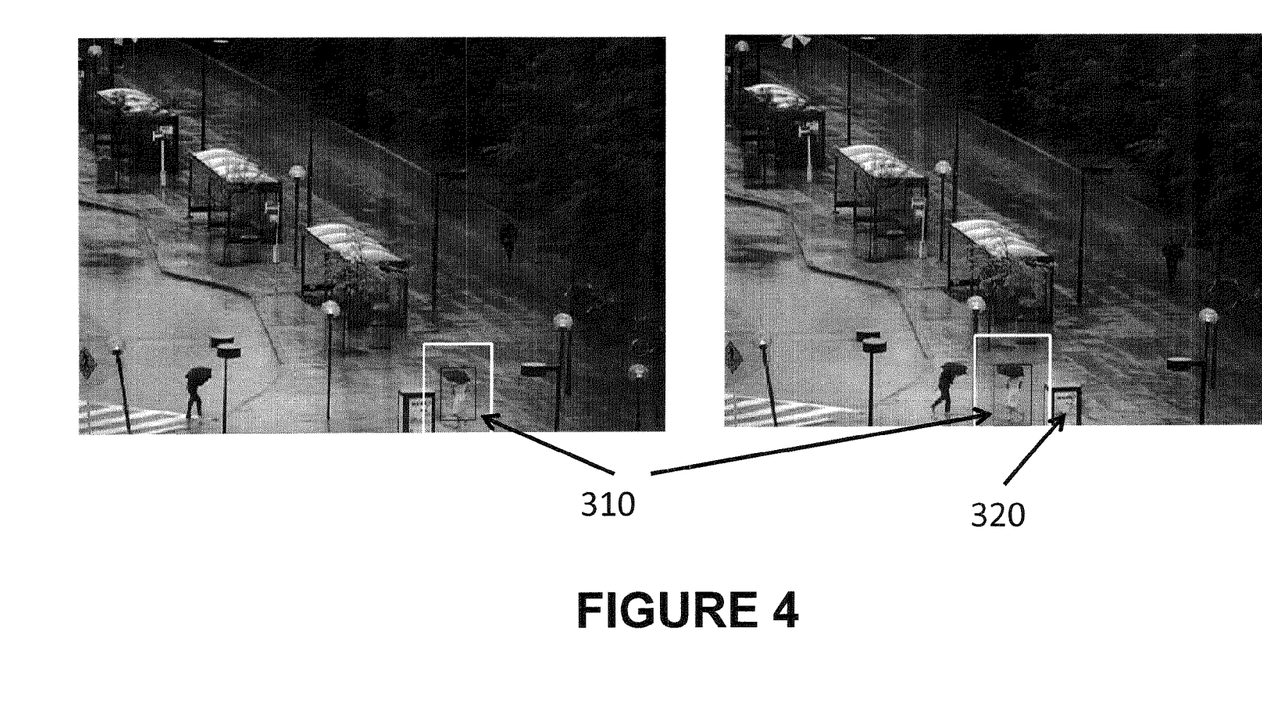
FIG. 4 is an exemplary image of video tracking according to various aspects of the present invention.
Figure 5:
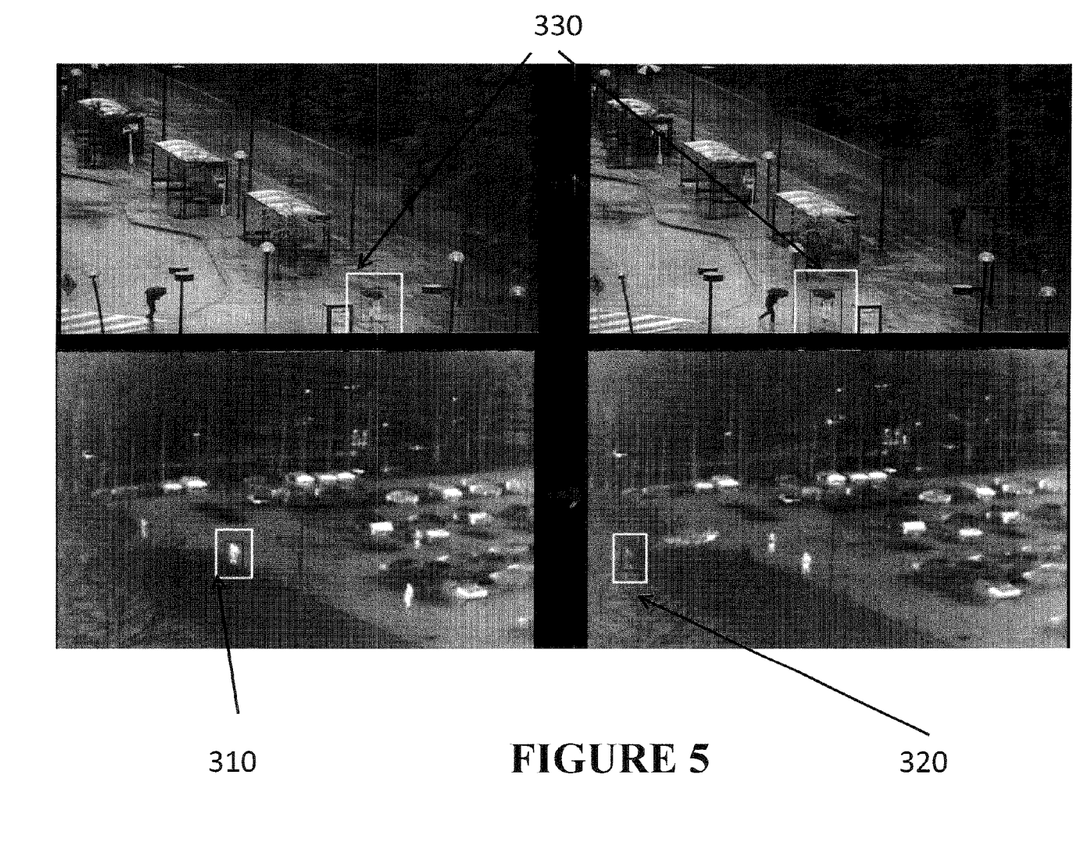
FIG. 5 is an exemplary image of video tracking according to various aspects of the present invention.
Figure 6:
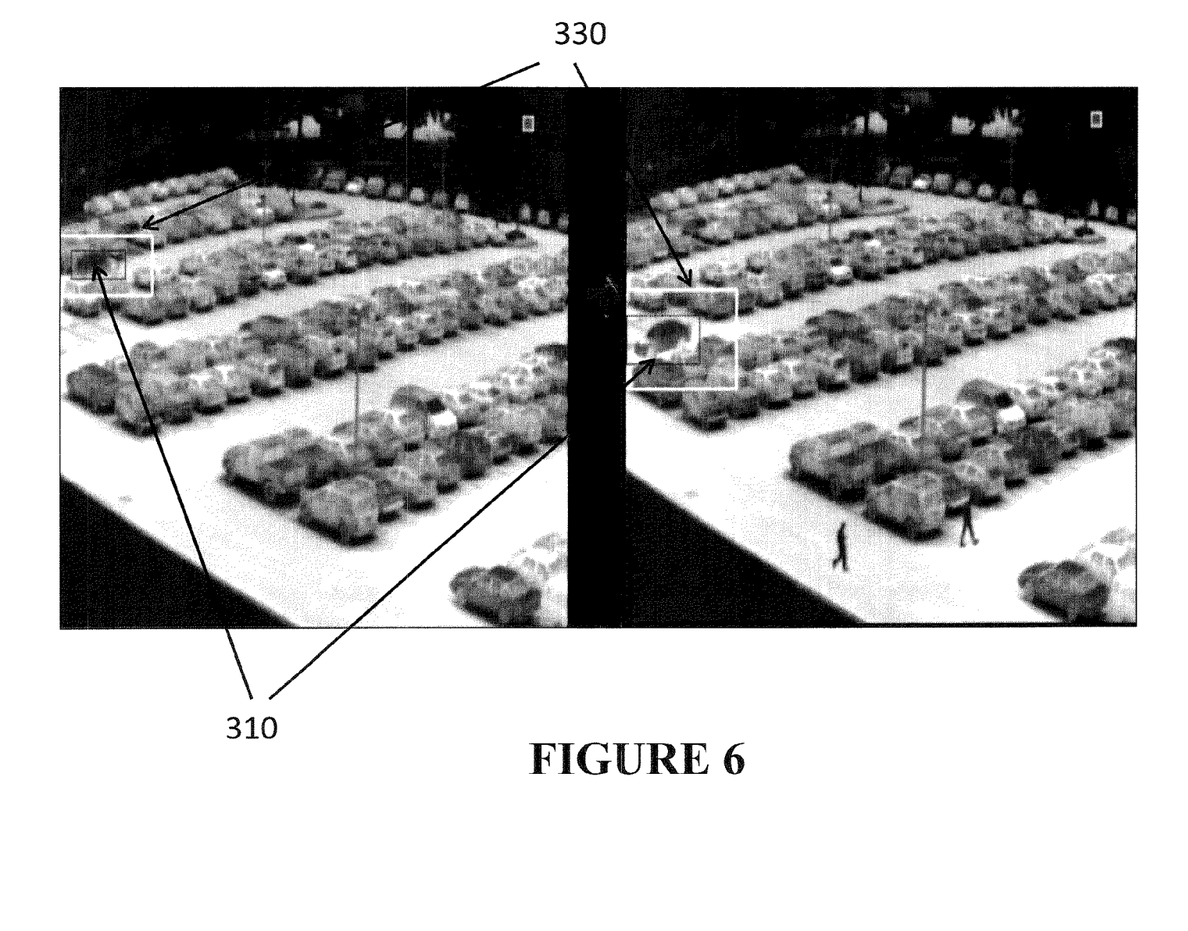
FIG. 6 is an exemplary image of video tracking according to various aspects of the present invention.
Figure 7:
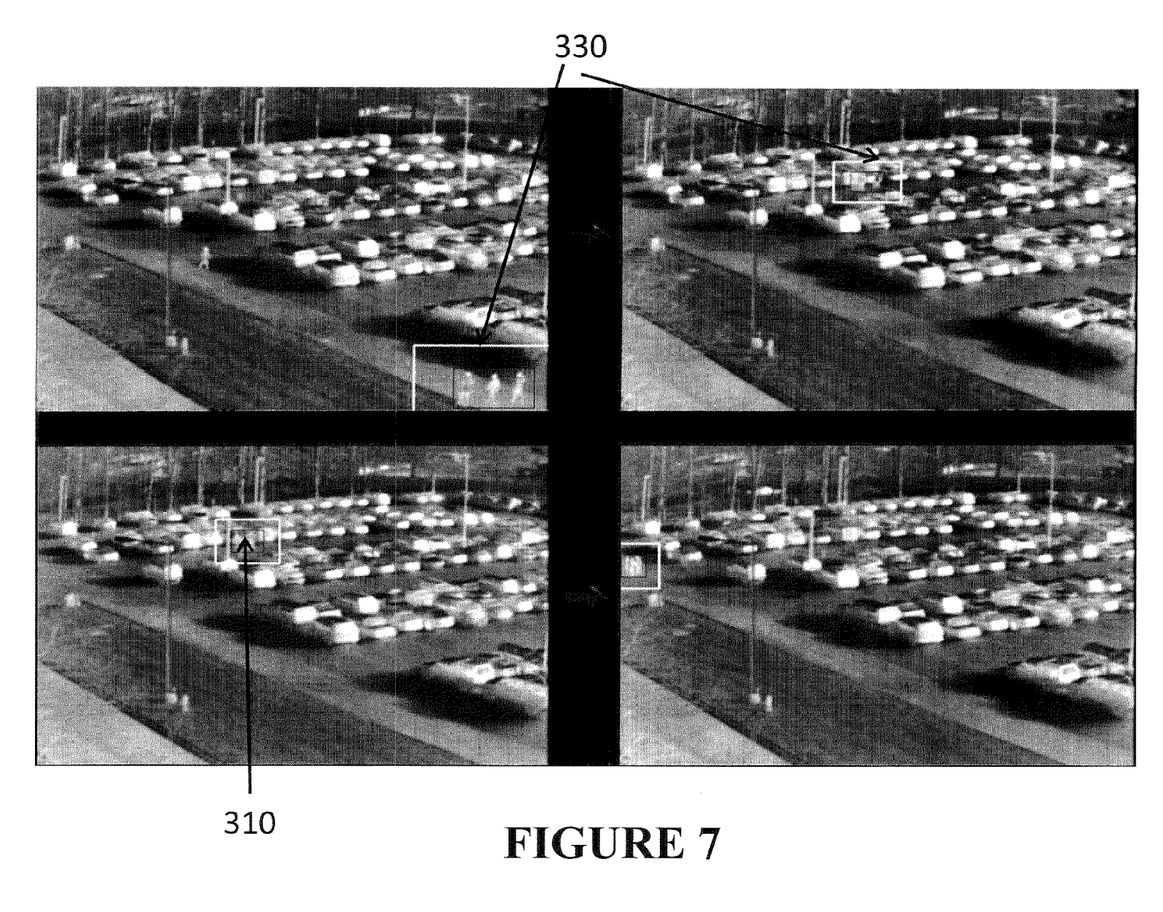
FIG. 7 is an exemplary image of video tracking according to various aspects of the present invention.
Figure 8A:
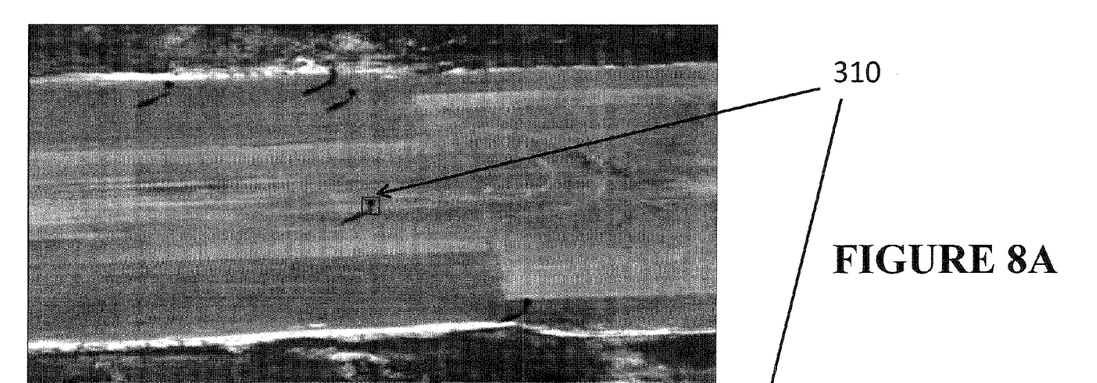
FIGS. 8A-8B are exemplary images of video tracking according to various aspects of the present invention.
Figure 8B:
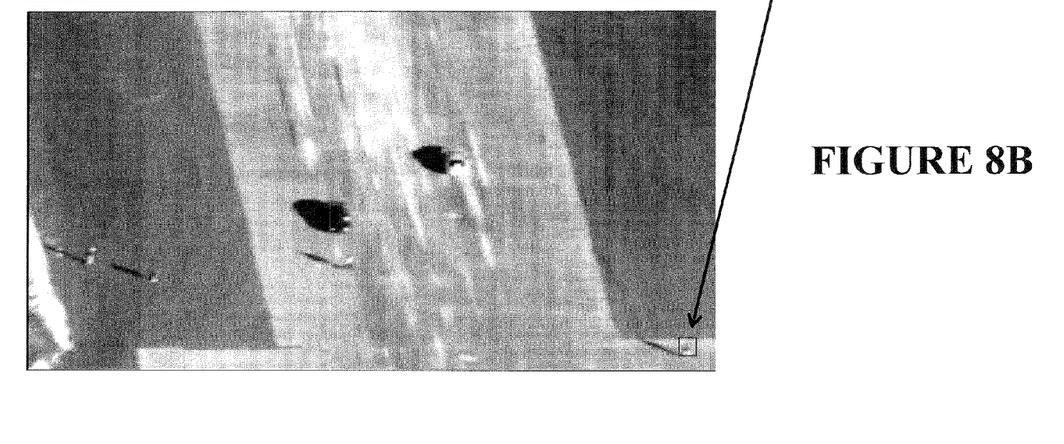
Figure 9A:
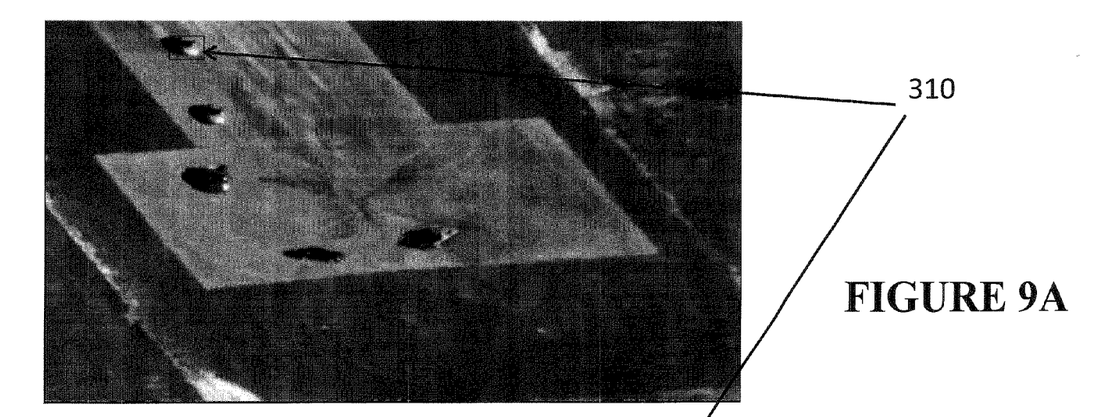
FIGS. 9A-9B are exemplary images of video tracking according to various aspects of the present invention.
Figure 9B:
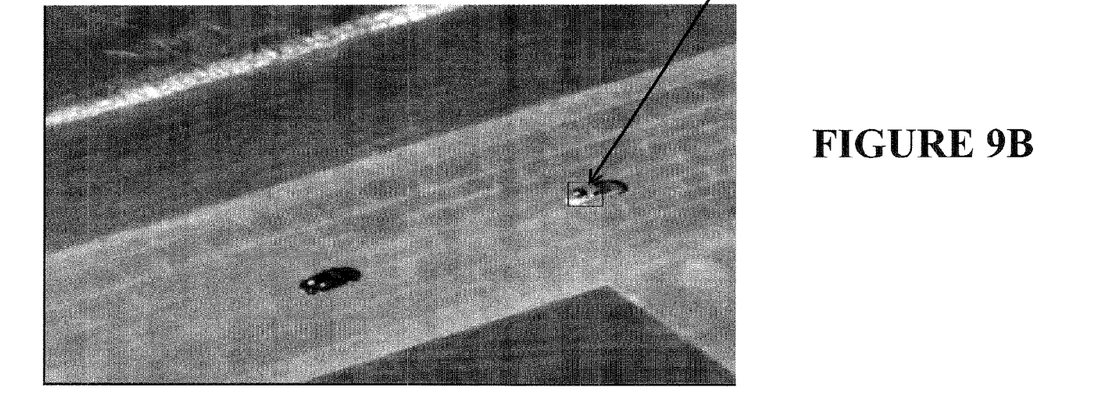

According to various aspects of the current invention, targets such as individuals can be tracked, even through occlusions such as a tree or passing people or vehicles, as illustrated in FIGS. 3-5. For example, in these figures, the bounding boxes 330 track the subject 310 to be tracked from the left-hand image to the right-hand image, even through the occlusion 320 which is a lamp post in FIG. 3, a telephone booth in FIG. 4, or tree branches in FIG. 5. The pixels corresponding to the occlusions 320 may be classified as background pixels because they would correspond to equations (1), (2) and (3) discussed above, and are thus not included in the signal-to-noise calculation. Accordingly, the target 310 may be continuously tracked even when the target 310 is momentarily hidden by an occlusion 320. FIGS. 6-9 illustrate additional examples of target tracking where, for example, the subject 310 is a vehicle, not a person, and the vehicle can be tracked within the tracking box 330 as the vehicle moves in a parking lot. In FIG. 7, the subject 310 may be more than one person and may be a group of persons, in which case the bounding box 330 may be enlarged to include all the people from the group being tracked. FIGS. 8A-8B and 9A-9B illustrate an exemplary aspect where tracking a subject 310 may be performed from long distance such as, for example, an airplane or satellite photography.

Figure 10:
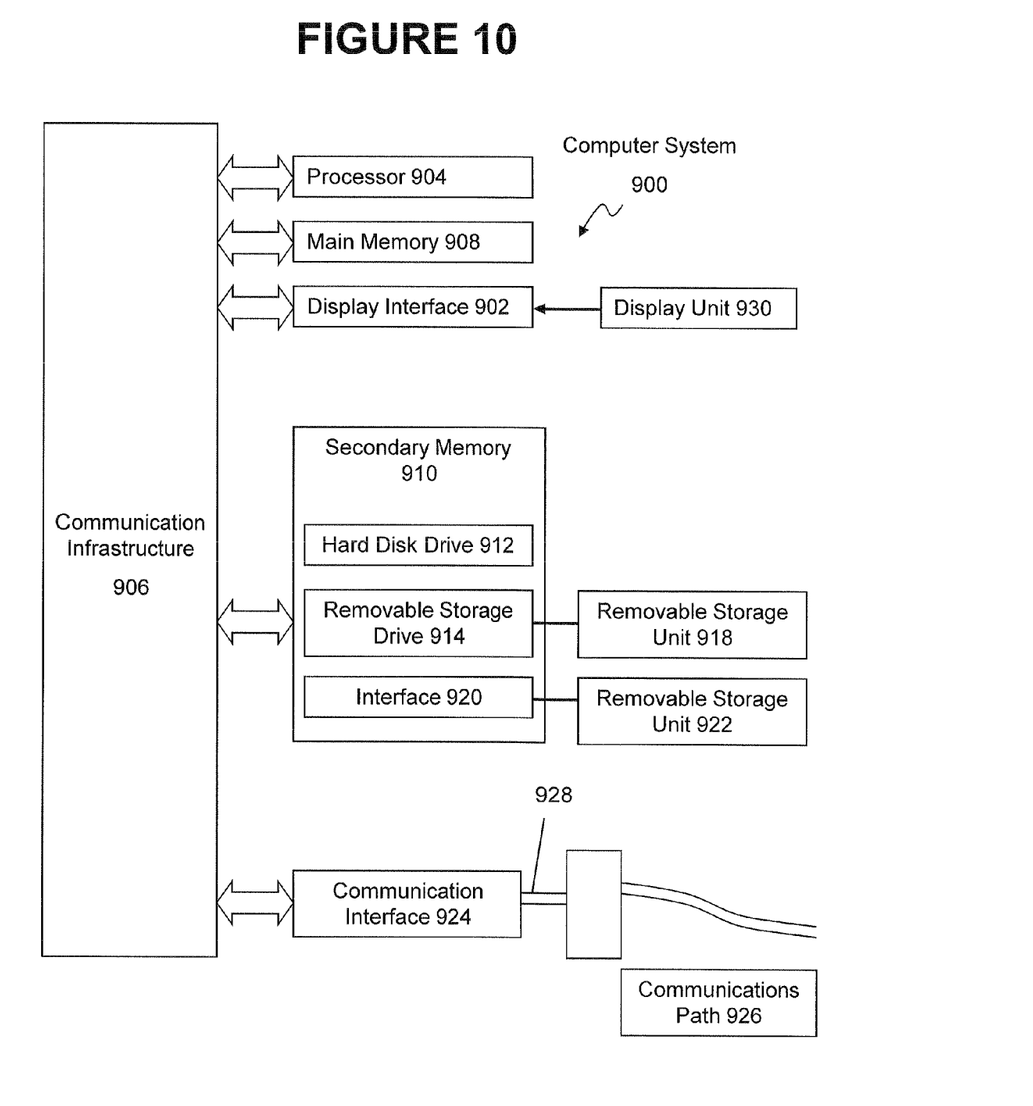
FIG. 10 presents an exemplary system diagram of various hardware components and other features, for use in accordance with an aspect of the present invention.

FIG. 10 presents an exemplary system diagram of various hardware components and other features, for use in accordance with an aspect of the present invention. The functions of the described aspects may be implemented using hardware, software, or a combination thereof and may be implemented in one or more computer systems or other processing systems. In one aspect, the invention is directed toward one or more computer systems capable of carrying out the functionality described herein. An example of such a computer system 900 is shown in FIG. 10.

Computer system 900 includes one or more processors, such as processor 904. The processor 904 is connected to a communication infrastructure 906 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data. In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 910 to perform the features of the present invention. Accordingly, such computer programs represent controllers of the computer system 900.

In an aspect where the invention is implemented using software, the software may be stored in a computer program product and loaded into computer system 900 using removable storage drive 914, hard drive 912, or communications interface 920. The control logic (software), when executed by the processor 904, causes the processor 904 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Figure 11:
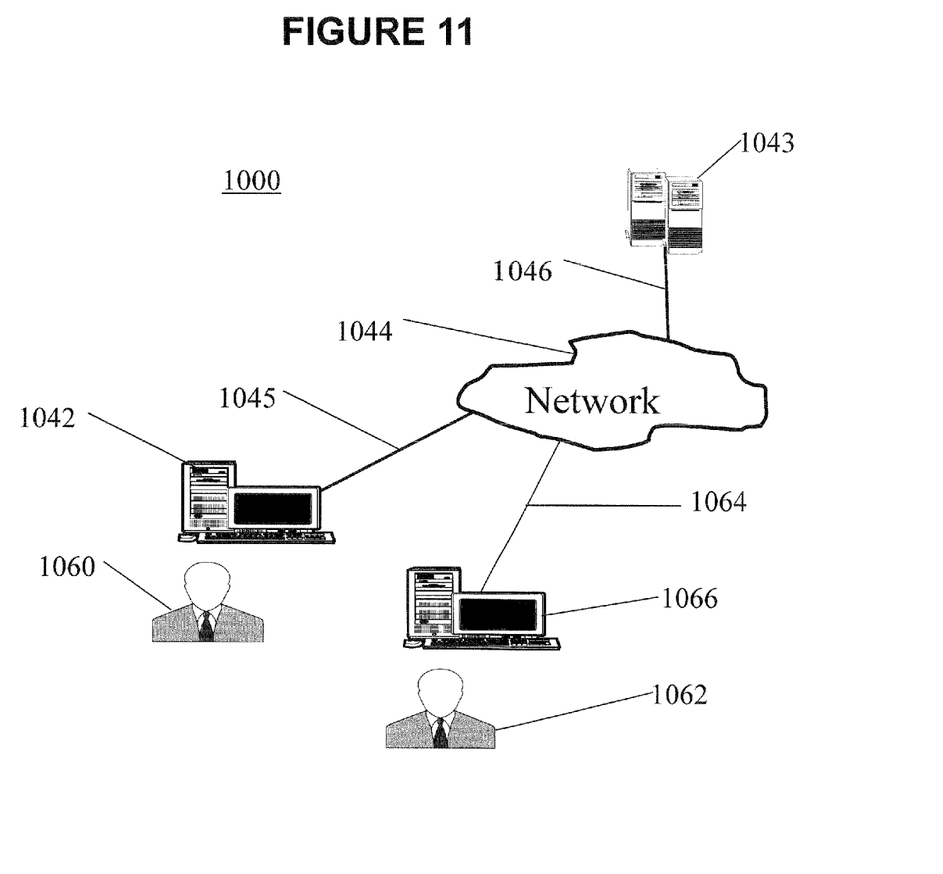
FIG. 11 is a representative diagram of various exemplary system components, in accordance with an aspect of the present invention.

FIG. 11 is a representative diagram of various exemplary system components, in accordance with an aspect of the present invention. FIG. 11 shows a communication system 1000 usable in accordance with the present invention. The communication system 1000 includes one or more accessors 1060, 1062 (also referred to interchangeably herein as one or more "users") and one or more terminals 1042, 1066. In one aspect, data for use in accordance with the present invention is, for example, input and/or accessed by accessors 1060, 1064 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiber optic links. In another aspect, the method and system of the present invention operate in a stand-alone environment, such as on a single terminal.

While this invention has been described in conjunction with the exemplary aspects outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope of the invention. Therefore, aspects of the invention are intended to embrace all known or later-developed alternatives, modifications, variations, improvements, and/or substantial equivalents.

What is claimed is:

1. A computer-assisted method of tracking via video one or more objects moving in an area, the computer having a processor, the method comprising:

receiving via the processor a video signal of the area including an image frame, the image frame having a plurality of pixels;

defining a first tracking box surrounding the one or more objects in the image frame at a first time;

determining first foreground pixels, first background pixels and first changing pixels in the first tracking box;

defining a plurality of second tracking boxes in the image frame in the vicinity of the first tracking box, each second tracking box having second foreground pixels, second background pixels and second changing pixels;

determining a signal-to-noise ratio for each of the plurality of second tracking boxes; and tracking the one or more objects by selecting the second tracking box having a highest signal-to-noise ratio as a new first tracking box.

2. The method of claim 1, wherein the signal-to-noise ratio is a ratio of a number of the foreground pixels over a number of the changing pixels.

3. The method of claim 1, wherein the first and second background pixels fulfill equations (1) to (3):

$$f_1(x_1+i,y_1+j)=f_2(x_1+i,y_1+j) \text{ AND} \tag{1}$$

$$f_1(x_2+i,y_2+j)=f_2(x_2+i,y_2+j) \text{ AND} \tag{2}$$

$$f_1(x_1+i,y_1+j) \neq f_2(x_2+i,y_2+j) \tag{3}$$

wherein:

$x_1$, $y_1$ and $x_2$, $y_2$ are coordinates of the first and second tracking boxes, respectively, with respect to an absolute reference;

i and j are relative coordinates of a given pixel with respect to the first tracking box or the second tracking box; and $f_1$ and $f_2$ are intensities of the given pixel.

4. The method of claim 3, wherein the first and second foreground pixels fulfill following combination of equations:

$$f_1(x_1+i,y_1+j) \neq f_2(x_1+i,y_1+j), \text{ OR} \tag{4}$$

$$f_1(x_2+i,y_2+j) \neq f_2(x_2+i,y_2+j), \tag{5}$$

AND $$f_1(x_1+i,y_1+j)=f_2(x_2+i,y_2+j) \tag{6}$$

5. The method of claim 4, wherein the first changing pixels and the second changing pixels are pixels that do not fulfill both the combination of equations (1) to (3) and the combination of equations (4) to (6).

6. The method of claim 3, wherein $x_1$, $y_1$ and $x_2$, $y_2$ are coordinates of a same corner of the first and second tracking boxes.

7. The method of claim 1, wherein defining the plurality of second tracking boxes includes defining around the first tracking box.

8. The method of claim 1, wherein the plurality of second tracking boxes have the same size as the first tracking box.

9. The method of claim 1, further comprising:

defining one or more additional first tracking boxes surrounding one or more other objects in the image frame at the first time;

determining additional first foreground pixels, additional first background pixels and additional first changing pixels in each of the one or more additional first tracking boxes;

defining a plurality of additional second tracking boxes for each of the one or more additional first tracking boxes in the vicinity of their corresponding additional first tracking box in the image frame, each of the plurality of additional second tracking boxes having additional second foreground pixels, additional second background pixels and additional second changing pixels;

determining a signal-to-noise ratio for each of the plurality of additional second tracking boxes; and tracking each of the one or more other objects by selecting, for each one of the one or more additional first tracking boxes, the corresponding additional second tracking box that has a highest signal-to-noise ratio as the new additional first tracking box.

10. The method of claim 9, wherein the additional second tracking boxes have a same size as the additional first tracking box.

11. A system for tracking via video one or more objects moving in an area, the system comprising:

a processor;

a user interface functioning via the processor; and a repository accessible by the processor; wherein a video signal of the area including an image frame is received, the image frame having a plurality of pixels;

a first tracking box surrounding the one or more objects in the image frame is defined at a first time;

first foreground pixels, first background pixels and first changing pixels are determined in the first tracking box;

a plurality of second tracking boxes are defined in the image frame in the vicinity of the first tracking box, each second tracking box having second foreground pixels, second background pixels and second changing pixels;

a signal-to-noise ratio is determined for each of the plurality of second tracking boxes; and the one or more objects are tracked by selecting the second tracking box having a highest signal-to-noise ratio as a new first tracking box.

12. The system of claim 11, wherein the signal-to-noise ratio is a ratio of a number of the foreground pixels over a number of the changing pixels.

13. The system of claim 11, wherein the first and second background pixels fulfill equations (1) to (3):

$$f_1(x_1+i,y_1+j)=f_2(x_1+i,y_1+j) \text{ AND} \tag{1}$$

$$f_1(x_2+i,y_2+j)=f_2(x_2+i,y_2+j) \text{ AND} \tag{2}$$

$$f_1(x_1+i,y_1+j) \neq f_2(x_2+i,y_2+j) \tag{3}$$

wherein:

$x_1$, $y_1$ and $x_2$, $y_2$ are coordinates of the first and second tracking boxes, respectively, with respect to an absolute reference;

i and j are relative coordinates of a given pixel with respect to the first tracking box or the second tracking box; and
$f_1$ and $f_2$ are intensities of the given pixel.

14. The system of claim 13, wherein the first and second foreground pixels fulfill following combination of equations:

$$f_1(x_1+i, y_1+j) \neq f_2(x_1+i, y_1+j) \text{ OR} \quad (4)$$

$$f_1(x_2+i, y_2+j) \neq f_2(x_2+i, y_2+j) \quad (5)$$

AND $$f_1(x_1+i, y_1+j) = f_2(x_2+i, y_2+j) \quad (6).$$

15. The system of claim 14, wherein the first changing pixels and the second changing pixels are pixels that do not fulfill both the combination of equations (1) to (3) and the combination of equations (4) to (6).

16. The system of claim 11, wherein defining the plurality of second tracking boxes includes defining a plurality of second tracking boxes circularly around the first tracking box and in an outward direction from the first tracking box.

17. The system of claim 11, wherein the additional second tracking boxes have a same size as the additional first tracking box.

18. The system of claim 11, wherein:
one or more additional first tracking boxes surrounding one or more other objects in the image frame are defined at the first time;
first additional foreground pixels, first additional background pixels and first additional changing pixels are determined in each of the one or more additional first tracking boxes;
a plurality of second tracking boxes are defined for each of the one or more additional first tracking boxes in the image frame, the second tracking boxes being located in the vicinity of their corresponding additional first tracking box, each of the plurality of second tracking boxes having second additional foreground pixels, second additional background pixels and second additional changing pixels;
a signal-to-noise ratio is determined for each of the plurality of second tracking boxes; and
each of the one or more other objects are tracked by selecting, for each one of the one or more additional first tracking boxes, the corresponding second tracking box that has a highest signal-to-noise ratio as the new first additional tracking box.

19. A system for tracking via video one or more objects moving in an area, the system comprising:
means for receiving via the processor a video signal of the area including an image frame, the image frame having a plurality of pixels;
means for defining a first tracking box surrounding the one or more objects in the image frame at a first time;
means for determining first foreground pixels, first background pixels and first changing pixels in the first tracking box;
means for defining a plurality of second tracking boxes in the image frame in the vicinity of the first tracking box, each second tracking box having second foreground pixels, second background pixels and second changing pixels;
means for determining a signal-to-noise ratio for each of the plurality of second tracking boxes; and
means for tracking the one or more objects by selecting the second tracking box having a highest signal-to-noise ratio as a new first tracking box.

20. A non-transitory computer program product comprising a computer usable medium having control logic stored therein for causing a computer to track via video one or more objects moving in an area, the control logic comprising:
first computer readable program code means for receiving a video signal of the area including an image frame, the image frame having a plurality of pixels;
second computer readable program code means for defining a first tracking box surrounding the one or more objects in the image frame at a first time;
third computer readable program code means for determining first foreground pixels, first background pixels and first changing pixels in the first tracking box;
fourth computer readable program code means for defining a plurality of second tracking boxes in the image frame in the vicinity of the first tracking box, each second tracking box having second foreground pixels, second background pixels and second changing pixels;
fifth computer readable program code means for determining a signal-to-noise ratio for each of the plurality of second tracking boxes; and
sixth computer readable program code means for tracking the one or more objects by selecting the second tracking box having a highest signal-to-noise ratio as a new first tracking box.

* * * * *